Nov. 3, 1959    L. S. KRAUS    2,911,205
METHOD AND APPARATUS FOR INCREASING GAS ABSORPTION IN LIQUIDS
Filed March 14, 1955    2 Sheets-Sheet 1
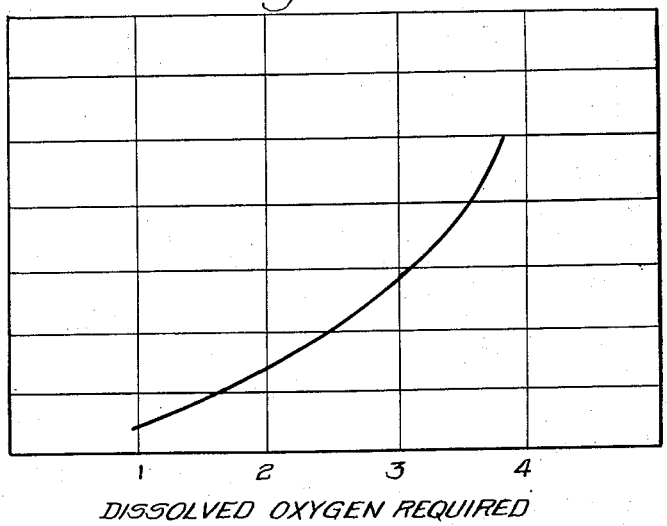
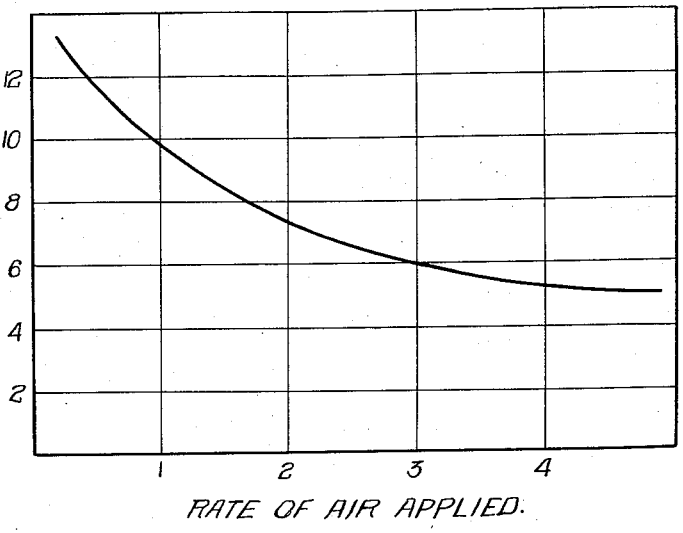
INVENTOR.
Leon S. Kraus,
BY
Cromwell, Greist & Warden
Attys.

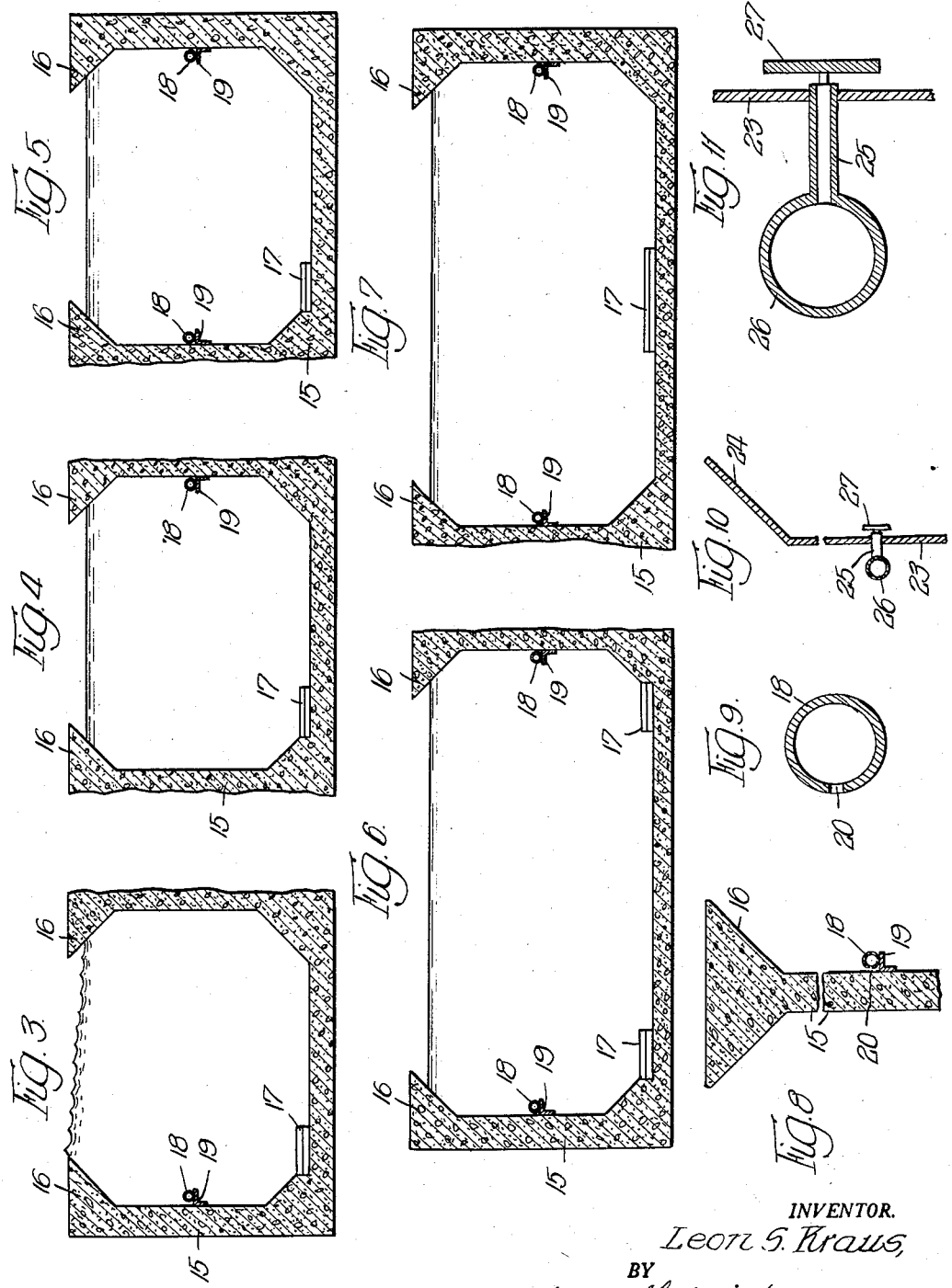

United States Patent Office 2,911,205
Patented Nov. 3, 1959

2,911,205

METHOD AND APPARATUS FOR INCREASING GAS ABSORPTION IN LIQUIDS

Leon S. Kraus, Peoria, Ill.

Application March 14, 1955, Serial No. 494,215

8 Claims. (Cl. 261—122)

The present invention relates generally to a method and apparatus for improving the rate and degree of gas absorption or dissolution in liquids. More specifically, the present invention is directed to a method and apparatus for introducing air into sewage and sewage-activated sludge mixtures to bring about a greater absorption of oxygen in the sewage or sewage-activated sludge mixture than has heretofore been possible under conventional practices.

In the absorption of gas in a liquid, there are two factors which are of primary concern. The first of these factors is that the rate of absorption of a gas in a liquid is a direct function of the time of contact between the gas and the liquid. The second factor involved is that the rate of absorption of a gas in a liquid is an inverse function of the bubble size of the gas. The liquid film in contact with the bubbles is saturated with the gas almost simultaneously upon the release of the gas bubbles into the liquid. The saturated film can then absorb no further amounts of gas until the dissolved gas contained within the film is diffused into the surrounding liquid. The rate of diffusion in a liquid is generally low, so that adequate contact between the gas and the liquid, with respect to the time element, is essential to accomplish appreciable absorption. It is then important in dissolving gases in liquids to allow adequate time of contact between the gas and the liquid and also control the bubble size to facilitate absorption.

The aforementioned factors are of particular importance in the treatment of sewage or sewage-activated sludge mixtures with oxygen. In this art it is a generally accepted premise that in order to introduce oxygen into solution in sewage-activated sludge mixtures, air must be applied near the bottom of rather deep tanks. The air must also be broken up by suitable means into sufficiently small bubbles to further aid in efficient absorption. Conventional apparatus for breaking up air into small bubbles is that which is commonly referred to as a diffuser. Such apparatus is in plate form made from sintered ceramic material placed in longitudinal bands of two to four feet in width. These plates contain many interconnected pore-type passageways and are well known and widely used as exemplified by the prior art. Air is forced through the diffuser and, as a result, is broken up into very small bubbles having average diameters on the order of 0.05 to 0.20 of an inch as, for example, set forth in "Diffuser Plate Studies" by A. J. Beck, Sewage Works Journal, vol. 8, pages 22 to 37, January 1936, which bubbles then rise into contact with the sewage. Due to the sintered porous nature of the diffuser, it is necessary to utilize considerable pressure to force the air through the diffuser and thus provide an adequate source of small bubbles of air. As a result, in the operation of a diffuser, a considerable pressure loss is experienced and due to the minute orifice size in the diffuser, the air must be thoroughly cleaned prior to its contact with the diffuser to prevent clogging thereof. Consequently, a considerable amount of apparatus is now necessary to properly supply sufficient quantities of small bubbles of air to a body of sewage under treatment. Adequate pumping apparatus must be used to overcome the pressure loss experienced in the operation of the diffuser and suitable air cleaning apparatus must be present to reduce clogging of the diffuser during its operation.

Still referring in particular to the treatment of sewage, it has been established that as the requirement of dissolved oxygen is increased, the additional amounts of air applied are not directly proportional to the desired increased quantity of dissolved oxygen. As a matter of fact, as the oxygen requirement is increased, the required supply of air necessary to meet the new oxygen requirement varies as its exponential function. This function is plotted in the curve in Fig. 1 of the accompanying drawings from which it can be seen that a considerably greater rate of air requirement accompanies a relatively slight increase in dissolved oxygen requirement. For example, if the quantity of dissolved oxygen required is doubled, the quantity of air introduced into the sewage necessary to meet the new dissolved oxygen requirement is increased threefold. The threefold amount of air thus required increases the pressure loss through the diffuser and in some instances this is sufficient to raise the pressure demand on the blower to a point that it is impossible to supply the needed air and therefore necessary to acquire additional equipment. The resulting pressure loss through the diffuser becomes even further aggravated by the increased possibility of the diffuser becoming clogged by dust particles in the air. As a matter of fact, upon an increase in the air requirement, the diffuser must more frequently be cleaned, thereby necessitating a greater number of dust collectors in the system to properly maintain the functioning of the equipment. Such results are costly, not only from an equipment standpoint but also from a labor standpoint.

In conventional sewage treatment equipment, the power required to supply air to the aeration tanks by way of the diffusers is approximately a direct function of the product of the discharge volume capacity and pressure of the blower utilized. The additional power necessary to double the supply of diffused oxygen is more than threefold, inasmuch as the volume of air necessary is increased threefold and the resulting pressure requirement necessary to supply such a volume is even greater, particularly when the diffusers are partly clogged. The over-all effect of endeavoring to increase the oxygen supply to an aeration tank with a given set of known type diffusers results in greatly increased power requirement and maintenance costs. The maintenance cost can be reduced by the use of additional diffusers but such an approach results in a substantial increase in capital investment.

In the operation of aeration tanks of the type described, it has been observed that any given conventional system of diffusers is subjected to a practical limit with respect to the quantity of dissolved oxygen that can be supplied regardless of available power. As a matter of fact, as the quantity of air applied to the aeration tank increases, the percentage of oxygen absorbed by the sewage decreases, and a condition is finally reached where increasing the quantity of air does not appreciably increase the total absorbed oxygen in the aeration tank liquid. This particular phenomenon is graphically set forth in Fig. 2 of the accompanying drawings and it can be seen from this figure that there exists an upper practical limit for all types of conventional aeration equipment relying solely on the use of diffused air with respect to the obtainable amount of oxygen absorption. These limitations, while being discussed in conjunction with the aeration of sewage and the like, are also applicable to any type of gas absorption systems which utilize diffused gas.

To illustrate what occurs in a conventional spiral flow aeration tank commonly used in sewage treatment, it has been observed that an increase in air supply from 1.16 cubic feet per minute per square foot of diffuser area to 1.85 produces an increase in velocity near the tank surface from 1.7 feet per second to 2.6 feet per second. This amounts to an increase in surface velocity of 52.8% and represents a considerable decrease in contact time between the diffused air and the liquid. A reduction in contact time results in lower percentages of oxygen absorption from the air. This observation aids in the explanation of the curve set forth in Fig. 2 which shows that increased tank velocities caused by increasing the amount of diffused air applied results in a decrease in oxygen absorption percentage. Increases in liquid velocities are detrimental. However, turbulence within the body of liquid has been found to be an aid in increasing the oxygen absorption, due to the more efficient transfer of dissolved oxygen from the film surrounding the bubble to the liquid adjacent to it. Turbulence is also considered necessary, to a certain extent, in sewage treatment for the purpose of maintaining the solid or semi-solid constituents in suspension.

Turbulence is still further important in oxygen absorption at the surface of the liquid. A certain degree of oxygen absorption is realized from the air above the liquid and surface turbulence aids in this respect. Therefore, it is apparent that while an increase in liquid velocity tends to decrease the oxygen absorption, liquid turbulence aids in increasing oxygen absorption.

It is therefore an object of the present invention to provide a method of and means for increasing gas absorption in a liquid (particularly the absorption of oxygen in the aeration of sewage) by introducing increased amounts of gas and obtaining increased liquid turbulence without materially increasing liquid velocities.

Further, in connection with the operation of aeration tanks in the activated sludge process, it is an object of the present invention to reduce liquid velocities while increasing the volume of air supplied and, as a result, increase the percentage of oxygen absorbed without increasing diffused gas requirements.

Another object of the present invention is to provide, in connection with the activated sludge process, a suitable method and apparatus for increasing oxygen absorption without increasing diffused air requirements and pressure loss resulting therefrom, thereby reducing clogging of the gas diffusers and the accompanying costs and maintenance.

Other objects not specifically set forth will become apparent from the following detailed description.

In the drawings:

Figs. 1 and 2 are graphs which have been previously described;

Fig. 3 is a schematic vertical section of a modified treatment tank setting forth one of the modifications of the apparatus of the present invention;

Figs. 4 to 7 are similar to Fig. 3 and set forth further modifications of the apparatus of the present invention;

Fig. 8 is a fragmentary sectional view on enlarged scale of a wall of a treatment tank illustrating the mounting of a gas distributor as shown in Figs. 3 to 7;

Fig. 9 is an enlarged vertical section through the gas distributor shown in Fig. 8;

Fig. 10 is a fragmentary sectional view of a modified type of gas distributor mounted on a wall of a steel tank; and Fig. 11 is a sectional view on an enlarged scale of the modified gas distributor shown in Fig. 10.

In accordance with the teachings of the present invention, it has been found that by introducing jetted undiffused gas or air (as distinguished from diffused gas or air of the type previously described) through a suitable jet type distributor mounted within a properly designed gas absorption system at a point intermediate the top and bottom of the liquid body under treatment, an increased rate of absorption can be obtained. By referring to a properly designed gas absorption system, it is meant to cover a gas absorption system of conventional design which utilizes a tank having gas diffusers mounted near the bottom portion thereof. By referring to jetted or undiffused gas, it is meant to cover gas introduced directly into contact with the liquid without first being subjected to a diffusing or bubble size reduction action of the type provided by standard diffusers. As the term implies diffused gas is well understood in the art as designating a mass of discrete minute bubbles caused by the passing of gas through a porous medium having many closely associated and clustered passageways of very small size or diameter, the smallness of size of the passageways in combination with the introduction of gas under substantial pressure into the medium resulting in the formation of diffused gas. As distinguished from diffused gas, undiffused gas as used in carrying out the present invention is that which is merely introduced into a liquid body without special consideration being given to bubble size and primarily for the purpose of affecting liquid velocities within the tank. Such undiffused gas is jetted into the liquid body preferably through a medium offering the least resistance to flow and at reduced submergence in the liquid body thus providing for a savings in power consumption as compared with that required in the supply of diffused gas. A suitable and preferred medium takes the form of a pipe provided with spaced drilled holes for feeding undiffused jetted gas into the liquid body along the submerged length of the pipe in a distributed manner. In view of the manner in which such gas is supplied, the term "distributed gas" is considered applicable and is used hereinafter for purposes of specifically describing the present invention.

By way of further example in regard to the well recognized difference between diffused and distributed gas, it has been set out above that standard diffuser plates will supply bubbles of an average diameter on the order of about 0.05 to 0.20 of an inch. Distributed gas bubble size is on the average of at least several times the size of diffused gas bubbles. In this respect average bubble size of distributed gas would be about 0.5 of an inch. In carrying out the method of the present invention, it is intended to distribute gas at a point intermediate the top and bottom portions of the body of liquid under treatment in addition to the usual introduction of diffused gas into the liquid near the bottom portion thereof. It has been found that by utilizing gas distribution in the manner set forth, substantially greater quantities of gas can be supplied than by the sole use of conventional diffusers positioned deep within the body of liquid. The undiffused gas distributed into the body of liquid, in accordance with the teachings of the present invention, creates a considerable degree of turbulence within the body of liquid and yet, at the same time, does not materially increase liquid velocities. Since a large part of the gas introduced into the liquid is supplied at a greatly reduced depth, the power requirements are lower than where the same quantities of gas are introduced solely by the use of diffusers. Less than one-half of the gas supplied is passed through the diffusers and the cost of the diffusing system is greatly reduced from the standpoint of pressure loss and air cleaning. It has been found that gas can be introduced at a point intermediate the top and bottom portion of the body of liquid under treatment and an increased absorption results without diffusing the gas so introduced or processing the gas in any particular manner. When this method is applied to the aeration of sewage, a higher rate of oxygen absorption results and the capacity of the aeration tank is increased.

In carrying out the method of the present invention, it has been found preferable to utilize treatment tanks which are open at the top and have baffling means along at least the top of the side wall adjacent which distributed gas or air is introduced. The baffling means aids in directing gas escaping at the surface of the liquid body back into contact with the liquid and produces a violent wave action at the liquid surface. It is also preferred to inject the undiffused distributed gas against some sort or deflecting means upon introduction of the gas into the treatment tank, thereby further increasing the turbulence of the liquid in the tank. As set forth above, increased turbulence aids in bringing about more efficient absorption of the gas by the liquid. The amount of distributed gas introduced as compared to the amount of diffused gas used must be sufficient to overcome the component of flow velocity of the diffused gas causing the same to rise toward the surface and to escape from the body of liquid. Such can best be accomplished by introducing the distributed gas to establish substantially countercurrent flow of the same at or near the liquid surface. This direction of flow must be sufficiently counter to the natural flow path of the diffused gas (normally a spiral-type roll resulting in substantial surface loss) to not only divert the diffused bubbles near the liquid surface back into the liquid body but also reduce tank velocities to cause appreciable dispersion of diffused gas within and throughout the entire body of liquid.

The present invention is particularly useful in connection with the treatment of sewage wherein it is necessary to maintain the solids of the sewage in suspension during aeration. The action of the undiffused or distributed air injected into the body of sewage aids, not only in increasing the amount of oxygen absorbed by the sewage from both sources of air, namely, the distributed air and the diffused air, but also increases turbulence thereby retaining proper suspension. The following explanation of the apparatus of the present invention will be made with particular reference to sewage treatment. However, it should be understood that the method of the present invention is applicable to any type of gas-in-liquid absorption.

Fig. 3 shows one arrangement for distributing air into a conventional sewage aeration tank, in accordance with the invention. An aeration tank of known type is shown having inwardly protruding baffles 16 positioned along the tops of the side walls 15. Adjacent one side of the bottom of the tank is mounted a series of diffusers 17 of conventional design. Intermediate the top and bottom of the tank is mounted an air distributing means 18 which, in the instance shown, is an air distributing pipe. As shown in Fig. 3, the air distributing means 18 is positioned adjacent the tank wall on the same side of the tank as the diffuser 17. The distributor 18 may, for example, take the form of four or five inch pipe which is mounted on wall brackets 19 so that the pipe is spaced about one to two inches from the wall. Said piping may have a series of ⅜ inch diameter air-distributing orifices 20—20 (Figs. 8 and 9) in the side thereof adjacent the wall 15. The orifices may be spaced apart from seven to nine inches, although the size and spacing thereof may vary within reasonable limits. It will also be understood that other air distribution systems may be used.

Fig. 4 shows a modification in which the air distributing means 18 is mounted adjacent the wall of the tank opposite the side on which the diffuser 17 is located. Fig. 5 shows a further modification which depicts the mounting of air distributing means 18—18 on both of the side walls of the tank. Fig. 6 illustrates the use of two rows of air diffusers 17—17, each of which is disposed at the bottom on opposite sides of the tank. As in Fig. 5, each wall of the tank in Fig. 6 has mounted thereon air distributing means 18—18. Fig. 7 illustrates still a further modification wherein a row of diffusers 17 is positioned in the central bottom portion of the tank while each wall of the tank has mounted thereon an air distributing means 18—18.

It can be seen from the aforementioned modifications that various arrangements of the gas distributing means 18, the diffuser 17, and deflecting baffle 16 may be used to obtain the desired results. The particular arrangement used will depend upon the type of liquid treated and, in some instances, one of the arrangements set forth in Figs. 3–7 will be more efficient in operation than the others. For example, it has been found that in the treatment of sewage the modification shown in Fig. 4 provides excellent oxygen absorption. In this modification, the air distributor is positioned on the wall opposite to that which is adjacent to the diffusers. While the velocities within the tank are reduced under this modified arrangement, they are nevertheless sufficient to maintain the solid and semi-solid constituents of the activated sludge in suspension. Here, as in all of the modifications shown, a very turbulent condition at the surface is created. This is illustrated in Fig. 3 and similar choppy wave action at the liquid surface is obtained with the other modifications. It has been found that bottom velocities are decreased 76% from 1.25 feet per second to 0.30 feet per second and, as a result, it is possible with the use of reasonable quantities of distributed air to reverse the normal direction of flow produced by the diffused air, thus affording a much longer path for the diffused air bubbles to travel and thereby substantially increasing the time of contact between the diffused air bubbles and the liquid. Thus, the distributed air functions to increase surface turbulence and counteract to the degree desired the tank velocities, these desirable functions being obtained primarily by introducing the distributed air to flow upwardly along the side wall of a tank and countercurrently to normal liquid roll.

Referring to the modification set forth in Fig. 3, it has been found that the application of distributed air lowers the bottom velocity in the tank approximately 31% from 1.6 feet per second to about 1.1 feet per second. Here again this condition is desirable since it affords a greater time of liquid-bubble contact. At the same time, the surface turbulence is increased approximately 200% and such an increase affords, in addition to a desirable turbulence condition, a tendency to divert rising bubbles from the diffusers back into the liquid on the opposite side of the tank, thereby again providing a greater time for bubble-liquid contact.

Referring to the modification set forth in Fig. 6, it can be seen here that the width of the tank is greater than those shown in Figs. 3–5. In the instance where larger tanks are utilized, it is advantageous to eliminate intermediate walls, thus providing lower construction costs. It has been found possible to realize increased absorption by utilizing two rows of diffusers on opposite sides of the tank and, as a result, no intermediate wall is required.

The modification set forth in Fig. 7 is similarly effective in tanks of greater width as that shown in Fig. 6. It has been found that this particular modification simulates the conditions present in the modification shown in Fig. 4, namely, high oxygen absorption and low bottom velocities.

The distributor pipes 18—18 in each embodiment should preferably be so positioned with respect to the adjacent tank wall and the orifices therein so turned toward the wall that the maximum amount of distributed air discharging therefrom hits the baffle 16 thereabove. The best position can be readily determined by simply observing when the greatest surface agitation is obtained.

Figs. 10 and 11 show a modified gas distributing means particularly suitable for use in conjunction with steel tanks. A wall of a steel tank is indicated at 23 having a baffle 24 at the top thereof. An orifice tube 25 projects in sealed relationship through the wall 23 and is connected to a gas supply pipe 26 suitably mounted outside of the tank. The outlets of the orifice tubes 25 positioned within the tank serve to distribute gas into the liquid from the header pipe 26. As can be seen clearly in Fig. 11, a deflector plate 27 is mounted on each orifice tube 25 directly in front of and spaced from the outlet thereof. Each deflector plate 27 acts to deflect the gas introduced into the tank to further aid in creating turbulence within the liquid.

It will be apparent that the additional apparatus necessary for practicing the present invention is neither complicated nor expensive and that it may readily be installed in existing equipment. Therefore, there are no practical obstacles to prevent the invention from being adopted and taken advantage of promptly and on a wide scale.

The invention has been and is being successfully practiced in spiral flow type aeration tanks similar to Figs. 3 and 4. These particular tanks are 23.5 feet wide between the side walls, 189 feet in length and 16 feet deep and are equipped with diffusers at the bottom. Air is distributed through piping 18—18 arranged as shown in Figs. 3 and 4 with the distributor pipes being submerged about four feet.

The rate of air supplied to the diffusers 17—17 at the tank bottom may be varied between two and eight cubic feet per minute per foot of tank length, and the rate of air supplied to the distributor pipes 18—18 may be between four and twelve cubic feet per minute per foot of tank length. The rate of aeration through each means is adjusted to obtain at least one part per million of dissolved oxygen in the effluent end of the tank.

The rate of diffused air is set at a minimum. As the dissolved oxygen decreases, the distributed air is increased. If the dissolved oxygen continues to fall after the maximum rate of application of distributed air is reached, then the diffused air rate is increased.

With the diffused air at a normal rate and the distributed air shut off, the surface of the aeration tanks is quite unruffled, few, if any, waves being present. The air is rising from the diffusers and hits the deflecting baffle above it and is largely released at the water surface. After the application of the distributed air a great change takes place in the tank. The surface is violently disturbed and is covered with small choppy waves. While surface velocities are increased, over-all tank velocities are reduced.

The representative data presented in the following table was obtained on two different days in the operation of three batteries of aeration tanks with each battery containing three aeration tanks as described above. One tank in battery No. 1 was equipped for applying both diffused and distributed air as shown in Fig. 4, and the other two were equipped as shown in Fig. 3. The aeration tanks in batteries 2 and 3 were equipped for diffused air only.

*Table on plant operation aeration tank data*

|  | Batteries 1, 2 & 3 | | Battery 1 only | |
| --- | --- | --- | --- | --- |
|  | 1st Test | 2nd Test | 1st Test | 2nd Test |
| Raw sewage—Thousand population equivalent | 222 | 240 | 144 | 154 |
| Aeration period hours | 2.98 | 2.81 | 2.31 | 2.16 |
| Diffused air million cubic feet per day | 10.7 | 11.0 | 2.0 | 2.5 |
| Distributed air million cubic feet per day | 7.8 | 8.1 | 7.8 | 8.1 |
| Loading—Pounds of 5-day biochemical oxygen demand per thousand cubic feet of aeration tank | 42.9 | 50.6 | 82.6 | 97.6 |
| Total air—Cubic feet per pound of applied 5-day biochemical oxygen demand | 758 | 647 | 608 | 568 |
| Total air (corrected for submergence) cubic feet per pound of applied 5-day biochemical oxygen demand | 632 | 540 | 416 | 390 |
| Percent removal of biochemical oxygen demand | 88.6 | 85.0 |  |  |
| Gas consumption—Thousand cubic feet per million cubic feet of air |  |  |  |  |
| Diffused air | 13.5 | 13.1 |  |  |
| Distributed air | 6.5 | 6.5 |  |  |

Normal design for aeration tank capacity is in the order of 30 pounds of applied BOD per 1000 cubic feet of aeration tank capacity. Note that in battery 1 this value is between 80 and 100. Normal total values of cubic feet of air applied per pound of BOD is 1000 or more. Note the total air is in the order of 600 for battery 1 and when corrected for submergence it is but 400. One index of the advantage of distributed air over diffused air is the cubic feet of gas required to be burned in gas engines to produce the air. It is evident that the diffused air in this particular study required twice the gas quantity required for the same volume of distributed air.

It will be understood that specific embodiments of the invention described above or shown in the accompanying drawings are intended to be interpreted as illustrative and not in a limited sense.

What is claimed as new is:

1. In an activated sludge aeration tank for use in carrying out the activated sludge sewage treatment process having a bottom and side walls defining an elongated flow path, a baffle extending along the top of at least one side wall and projecting inwardly so as to overhang liquid in the tank, and air diffuser means positioned along said bottom and generally paralleling said side walls through which air may be diffused to create when not diverted a continuous upwardly rising column of minute air bubbles, the improvement comprising air distributor pipe means disposed at an intermediate depth in the tank adjacent one of said side walls having an overhanging baffle at the top, said pipe means having air discharge orifices therealong which are substantially fewer in number and substantially larger in size than the pores in said air diffuser means and through which a quantity of air at least about equal to said diffused air may be discharged so as to rise rapidly in a column of large air bubbles along the adjacent side wall and under the baffle at the top thereof by which it is deflected across the surface of the liquid in the tank thereby vigorously agitating said surface and diverting said upwardly rising column of minute air bubbles so that the paths of a substantial portion of said minute air bubbles are laterally deflected from their normal generally vertical paths into elongated paths through the tank contents wherein the same are diffused, the power required to discharge said air through said air pipe means being substantially less than that required to diffuse an equal quantity of air through said air diffusers.

2. In an activated sludge aeration tank for use in carrying out the activated sludge sewage treatment process having a bottom and opposite side walls defining an elongated flow path, a baffle extending along the top of at least one side wall and projecting inwardly so as to overhang liquid in the tank and air diffuser means positioned along said bottom and adjacent one tank side wall through which air may be diffused to create when not diverted a continuously upwardly rising column of minute air bubbles, the improvement comprising air distributor pipe means disposed adjacent the side wall opposite said one side wall having said air diffuser means adjacent thereto, said air distributor pipe means being disposed at an intermediate depth in the tank underneath the baffle at the top of said side wall adjacent thereto and having air discharge orifices therealong which are substantially fewer in number and substantially larger in size than the pores in said air diffuser means and through which a quantity of air at least about equal to said diffused air may be discharged so as to rise rapidly in a column of large air bubbles along the adjacent side wall and under the baffle at the top thereof by which it is deflected across the surface of the liquid in the tank toward the opposite side wall thereby vigorously agitating said surface and diverting said upwardly rising column of minute air bubbles so that the paths of a substantial portion of said minute air bubbles are laterally deflected from their normal generally vertical paths into elongated paths through the tank contents wherein the same are diffused, the power required to discharge said air through air pipe means being substantially less than that required to diffuse an equal quantity of air through said air diffusers.

3. In an activated sludge aeration tank for use in carrying out the activated sludge sewage treatment process having a bottom and opposite side walls defining an elongated flow path, a baffle extending along the top of at least one side wall and projecting inwardly so as to overhang liquid in the tank, and relatively wide air diffuser means positioned along said bottom and adjacent one tank side wall through which air may be diffused to create when not diverted a continuously upwardly rising relatively wide column of minute air bubbles, the improvement comprising air distributor pipe means disposed adjacent the side wall opposite the one having said air diffuser means adjacent thereto, said air distributor pipe means being relatively narrow in relation to said air diffuser means, being disposed at an intermediate depth in the tank at least about half-way up the adjacent side wall and well underneath the baffle at the top thereof, and having air discharge orifices therealong which are substantially fewer in number and substantially larger in size than the pores in said air diffuser means and through which a quantity of air at least about equal to said diffused air may be discharged so as to rise rapidly in a relatively narrow column of large air bubbles along the adjacent side wall and under the baffle at the top thereof by which it is deflected across the surface of the liquid in the tank toward the opposite side wall thereby vigorously agitating said surface and diverting said upwardly rising column of minute air bubbles so that the paths of a substantial portion of said minute air bubbles are laterally deflected from their normal generally vertical paths into elongated paths through the tank contents wherein the same are diffused, the power required to discharge said air through said air pipe means being substantially less than that required to diffuse an equal quantity of air through said air diffusers.

4. The improvement called for in claim 1 wherein said air diffuser means are positioned intermediate said side walls and said air distributor pipe means are positioned along opposite walls.

5. In the activated sludge sewage treatment process wherein aeration is carried out in a tank having an elongated flow path defined by the tank bottom and opposite side walls and wherein oxygen-containing gas is diffused into the body of sewage undergoing treatment from a location adjacent the tank bottom and in a band of minute bubbles, the improvement which comprises introducing at an intermediate depth adjacent a side wall gas in the form of a column of large rapidly rising bubbles, and deflecting said column of large bubbles and the stream of liquid lifted therewith across the top surface of the contents of said tank thereby vigorously agitating the same and diverting said upwardly rising wide column of minute bubbles so that the paths of a substantial portion of said minute bubbles are laterally deflected from their normal generally vertical paths into elongated paths through the tank contents wherein the same are diffused, the power required to introduce said gas in the form of said column of large rapidly rising bubbles being substantially less than that required to diffuse an equal quantity of gas in the form of said band of minute bubbles, and the quantity of gas introduced in the form of said large bubbles being at least about equal to the quantity of oxygen-containing gas diffused in the form of said minute bubbles, said oxygen-containing gas being introduced through pores in diffuser media and said other gas being introduced through discharge orifices which are substantially fewer in number and substantially larger in size than said pores.

6. In the activated sludge sewage treatment process wherein aeration is carried out in a tank having an elongated flow path defined by the tank bottom and opposite side walls and wherein air is diffused into the body of sewage undergoing treatment from a location adjacent the foot of one of said side walls in a band of minute bubbles, the improvement which comprises introducing at an intermediate depth adjacent the side wall opposite said one wall along the foot which air is being diffused, gas in the form of a column of large rapidly rising bubbles, and deflecting said column of large bubbles and the stream of liquid lifted therewith across the top turface of the tank contents toward the opposite side wall thereby vigorously agitating the same and diverting said upwardly rising wide column of minute bubbles so that the paths of a substantial portion of said minute bubbles are laterally deflected from their normal generally vertical paths into elongated paths through the tank contents wherein the same are diffused, the power required to introduce said gas in the form of said column of large rapidly rising bubbles being substantially less than that required to diffuse an equal quantity of gas in the form of said band of minute bubbles, and the quantity of gas introduced in the form of said large bubbles being at least about equal to the quantity of oxygen-containing gas diffused in the form of minute bubbles, said oxygen-containing gas being introduced through pores in diffuser media and said other gas being introduced through discharge orifices which are substantially fewer in number and substantially larger in size than said pores.

7. In the activated sludge sewage treatment process wherein areation is carried out in a tank having an elongated flow path defined by the tank bottom and opposite side walls and wherein air is diffused into the body of sewage undergoing treatment from a location adjacent the foot of one side wall in a relatively wide band of minute air bubles, the improvement which comprises introducing at an intermediate depth, at least about half-way up from the bottom, adjacent the wall opposite said one wall along the foot of which air is being diffusel, and at a position well underneath a baffle at the top of the wall, additional air in the form of a relatively narrow column of large rapidly rising bubbles, and deflecting said column of large bubbles and the stream of liquid lifted therewith by means of said baffle across the top surface of the tank contents toward the opposite side wall thereby vigorously agitating the same and diverting said upwardly rising wide column of minute bubbles so that the paths of a substantial portion of said minute bubbles are laterally deflected from their normal generally vertical paths into elongated paths through the tank contents wherein the same are diffused, the power required to introduce air in the form of said column of large rapidly rising bubbles being substantially less that that required to diffuse an equal quantity of air in the form of said band of minute bubbles, and the quantity of air introduced in the form of said large bubbles being at least about equal to the quantity of air diffused in the form of said minute bubbles, said diffused air being introduced through pores in diffuser media and said additional air being introduced through discharge orifices which are substantially fewer in number and substantially larger in size than said pores.

8. The improvement called for in claim 5 wherein the quantity of gas introduced in the form of a column of large bubbles exceeds the air introduced in the form of a band of minute bubbles.

References Cited in the file of this patent

UNITED STATES PATENTS

| | | |
|---|---|---|
| 485,665 | Schultz | Nov. 8, 1892 |
| 1,182,260 | Fleming | May 9, 1916 |
| 1,598,858 | Greenawalt | Sept. 7, 1926 |
| 1,936,305 | Leffler | Nov. 21, 1933 |
| 1,937,434 | Piatt | Nov. 28, 1933 |
| 2,027,370 | Currie | Jan. 14, 1936 |
| 2,144,385 | Nordell | Jan. 17, 1939 |
| 2,307,082 | Grotenhuis | Jan. 5, 1943 |
| 2,382,655 | Lannert | Sept. 7, 1943 |
| 2,676,919 | Pirnie | Apr. 27, 1954 |
| 2,717,774 | Obma | Sept. 13, 1955 |
| 2,733,048 | Rowland | Jan. 31, 1956 |

FOREIGN PATENTS

| | | |
|---|---|---|
| 228,733 | Germany | Nov. 25, 1910 |
| 328,031 | Germany | Oct. 25, 1920 |